(12) United States Patent
Carr

(10) Patent No.: US 11,560,015 B2
(45) Date of Patent: Jan. 24, 2023

(54) WHEEL HUB

(71) Applicant: Consolidated Metco, Inc., Vancouver, WA (US)

(72) Inventor: Alan Carr, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 354 days.

(21) Appl. No.: 16/649,483

(22) PCT Filed: Sep. 21, 2018

(86) PCT No.: PCT/US2018/052224
§ 371 (c)(1),
(2) Date: Mar. 20, 2020

(87) PCT Pub. No.: WO2019/060728
PCT Pub. Date: Mar. 28, 2019

(65) Prior Publication Data
US 2020/0238755 A1    Jul. 30, 2020

Related U.S. Application Data

(60) Provisional application No. 62/562,094, filed on Sep. 22, 2017.

(51) Int. Cl.
*B60B 27/00* (2006.01)
*G07C 5/08* (2006.01)
*G07C 5/00* (2006.01)

(52) U.S. Cl.
CPC ...... *B60B 27/0068* (2013.01); *B60B 27/0015* (2013.01); *G07C 5/006* (2013.01); *G07C 5/008* (2013.01); *G07C 5/0808* (2013.01)

(58) Field of Classification Search
CPC . B60B 27/0068; B60B 27/0015; G07C 5/006; G07C 5/008; G07C 5/0808
See application file for complete search history.

(56) References Cited

U.S. PATENT DOCUMENTS 2,600,029 A    6/1952 Rivington
2,747,454 A    5/1956 Bowersett
(Continued)

FOREIGN PATENT DOCUMENTS

CA    2957894    2/2019
CN    102267336 A    12/2011
(Continued)

OTHER PUBLICATIONS

Office Action cited in corresponding Canadian Application No. 3,076,244, dated Apr. 29, 2021, 4 pages.
(Continued)

*Primary Examiner* — Jamel E Williams
(74) *Attorney, Agent, or Firm* — Amsted Industries Incorporated

(57) ABSTRACT

A sensor is mounted to or embedded in a wheel hub. The sensor node includes a power source and a sensing device that detects and monitors at least one parameter associated with the wheel hub. The sensor node also includes a communication module that communicates via wireless communication signals and a processing device in communication with the sensing device and the communication module. The processing device collects data from the sensing devices, processes the data, and based on that processing, communicates information relating to the wheel hub to a remote server or network. A mesh network of multiple sensor nodes can be applied to multiple different wheel hubs on a vehicle and communicate with a central processing device. The processing device can thus monitor performance and/or operation of each wheel hub.

14 Claims, 3 Drawing Sheets

(56) References Cited

U.S. PATENT DOCUMENTS

| | | | |
|---|---|---|---|
| 3,823,639 A | 7/1974 | Liber | |
| 4,157,530 A | 6/1979 | Merz | |
| 4,333,351 A | 6/1982 | Bickford | |
| 4,529,961 A * | 7/1985 | Nishimura | B60C 23/0425 340/447 |
| 4,761,577 A | 8/1988 | Thomas | |
| 4,904,132 A | 2/1990 | Popenoe | |
| 5,757,084 A | 5/1998 | Wagner | |
| 5,828,135 A | 10/1998 | Barrett | |
| 5,945,665 A | 8/1999 | Hay | |
| 6,149,244 A | 11/2000 | Wagner | |
| 6,204,771 B1 | 3/2001 | Ceney | |
| 6,358,051 B2 | 3/2002 | Lang | |
| 6,358,061 B1 | 3/2002 | Regnier | |
| 6,398,395 B1 | 6/2002 | Hyun | |
| 6,490,935 B1 | 12/2002 | Joki et al. | |
| 6,535,135 B1 | 3/2003 | French | |
| 6,617,968 B1 | 9/2003 | Odisho | |
| 6,675,640 B2 | 1/2004 | Ehrlich et al. | |
| 7,369,966 B1 | 5/2008 | Scelsi | |
| 7,412,898 B1 | 8/2008 | Smith | |
| 7,703,669 B2 | 4/2010 | Amirehteshami | |
| 8,131,420 B2 | 3/2012 | Lynch et al. | |
| 8,448,520 B1 | 5/2013 | Baroudi | |
| 8,540,468 B2 | 9/2013 | Mekid | |
| 8,683,869 B2 | 4/2014 | Herley | |
| 8,695,432 B2 | 4/2014 | Hsieh | |
| 8,707,776 B2 | 4/2014 | Fischer | |
| 8,836,503 B2 | 9/2014 | Gelvin et al. | |
| 8,978,967 B2 | 3/2015 | Gamboa | |
| 2002/0033638 A1 | 3/2002 | Okada | |
| 2003/0093188 A1 | 5/2003 | Morita | |
| 2005/0047692 A1* | 3/2005 | Niebling | G01P 3/443 384/448 |
| 2007/0018837 A1 | 1/2007 | Mizutani | |
| 2007/0215032 A1 | 9/2007 | Melberg | |
| 2008/0117036 A1 | 5/2008 | Thomas | |
| 2009/0096599 A1* | 4/2009 | Kranz | B60C 23/045 340/459 |
| 2009/0207008 A1 | 8/2009 | Malis | |
| 2009/0284362 A1 | 11/2009 | Wilson | |
| 2010/0050778 A1 | 3/2010 | Herley | |
| 2010/0135604 A1 | 6/2010 | Ozaki et al. | |
| 2011/0291467 A1 | 12/2011 | Severini | |
| 2014/0070935 A1* | 3/2014 | Wang | B60C 23/0494 290/1 A |
| 2014/0309860 A1 | 10/2014 | Paulin | |
| 2015/0210350 A1 | 7/2015 | Biderman et al. | |
| 2015/0292996 A1 | 10/2015 | Hsieh | |
| 2015/0336527 A1 | 11/2015 | Ghannam | |
| 2016/0076948 A1 | 3/2016 | Hossle | |
| 2017/0206720 A1 | 7/2017 | Ellis | |
| 2017/0261450 A1 | 9/2017 | Baarman et al. | |
| 2018/0118158 A1 | 5/2018 | Davis | |
| 2018/0202480 A1 | 7/2018 | Kumar | |
| 2019/0249706 A1 | 8/2019 | Hess | |
| 2020/0161898 A1 | 5/2020 | Seibert | |
| 2020/0164704 A1 | 5/2020 | Ciocia | |

FOREIGN PATENT DOCUMENTS

| | | |
|---|---|---|
| CN | 102781768 A | 11/2012 |
| CN | 106715163 A | 5/2017 |
| DE | 102013214580 A | 1/2015 |
| DE | 102014218370 | 3/2016 |
| DE | 102015216576 | 3/2017 |
| EP | 3043083 | 7/2016 |
| FR | 2669728 A1 | 5/1992 |
| WO | 2015010693 | 1/2015 |
| WO | 2016040763 | 3/2016 |
| WO | 2017072143 | 5/2017 |
| WO | 2017073646 | 5/2017 |

OTHER PUBLICATIONS

International Search Report in corresponding International Application No. PCT/US2018/52224, dated Dec. 4, 2018, 10 pages.
European Search Report in corresponding European Application No. 18858625.9, dated Jun. 18, 2021, 35 pages.
Office Action cited in corresponding Australian Application No. 2018338210, dated Feb. 25, 2021, 4 pages.
Office Action in corresponding Indian Application No. 202047016502, dated Feb. 18, 2021, 6 pages.
Checkpoint Medium Arrow®; Technical Data Sheet from www.checkpoint-safety.com; publicly available before Oct. 9, 2019; 2 pages.
DTI SmartBolts; DTI Visual Indication System™ product guide printed from Wayback Machine Archive dated Sep. 13, 2019 of http:www.smartbolts.com; 5 pages.
Faraday's law of induction definition from Wikipedia printed from Wayback Machine https://en.wikipedia.org/wiki/Faraday's_law_of_induction dated Sep. 23, 2018; 11 pages.
International Search Report and Written Opinion from PCT/US2019/062586 dated Jan. 22, 2020; 16 pages.
Safewheel®; Technical Data Sheet from www.checkpoint-safety.com; publicly available before Oct. 9, 2019; 2 pages.
Salisbury, Mark; New Technology Launched Offering World First in Heavy Fleet Wheel and Tyre Security from https://www.fleetpoint.org/fleet-management-2/new-technology-launched-offering-world-first-in-heavy-fleet-wheel-andyre-security/; Nov. 27, 2018; 5 pages.
Squirrel®; Technical Data Sheet from www.checkpoint-safety.com; publicly available before Oct. 9, 2019; 2 pages.
Valley Forge & Bolt Mfg_ Co. website printed from Wayback Machine Archive dated Oct. 31, 2018 of https://www.lbolts.com; 11 pages.
International Search Report and Written Opinion from PCT/US2020/054827 dated Dec. 28, 2020; 10 pages.
Office Action in corresponding Chinese Application No. 201880069308.8, dated Aug. 4, 2021, 19 pages.
Second Examination Report in corresponding Australian Application No. 2018338210, dated Oct. 6, 2021, 5 pages.
Examination Report No. 3 in corresponding Australian Application No. 2018338210, dated Feb. 11, 2022, 8 pages.
Office Action in corresponding Chinese Application No. 201880069308.8, dated Mar. 16, 2022, 12 pages.
Second Office Action cited in corresponding Canadian Application No. 3,076,244, dated Nov. 18, 2021, 6 pages.
Requisition by the Examiner in corresponding Canadian Application No. 3,076,244, dated Jul. 4, 2022, six pages.
Communication pursuant to Article 94(3) EPC in corresponding European Application No. 18858625.9, dated Dec. 7, 2022, 8 pages.

* cited by examiner

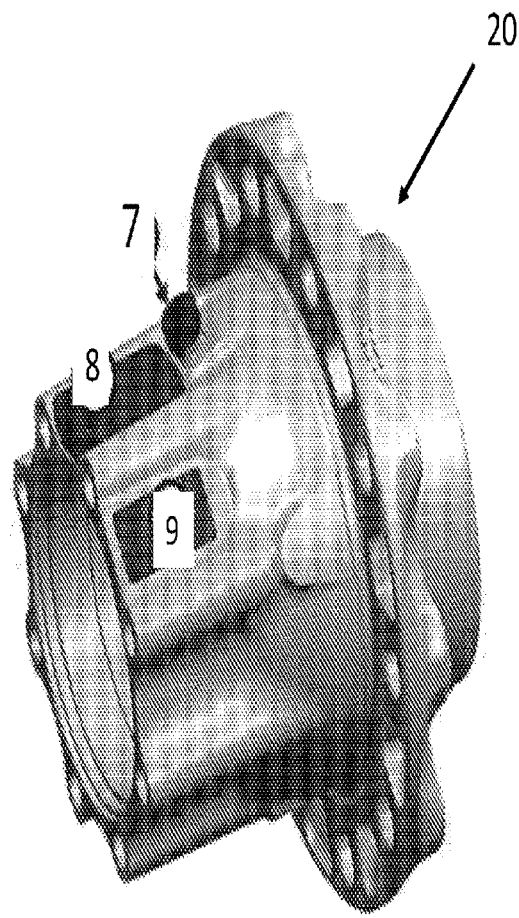
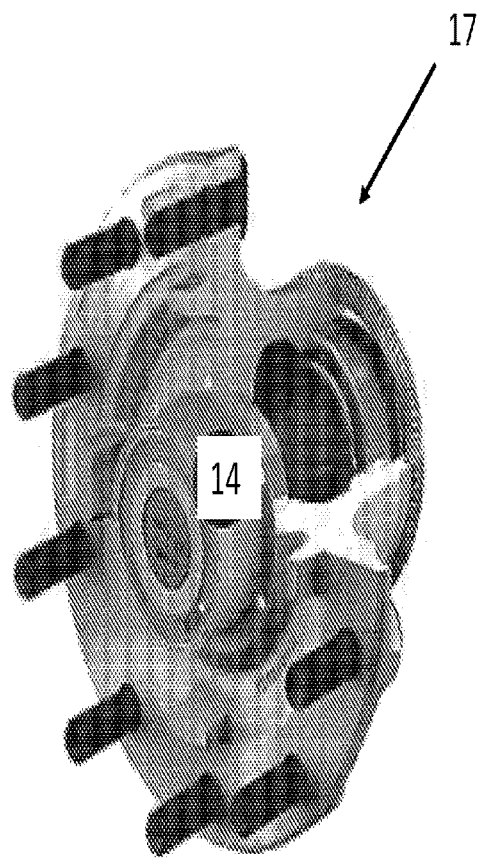
FIGURE 3
FIGURE 4

WHEEL HUB

RELATED APPLICATIONS

This application claims the benefit of U.S. provisional patent application No. 62/562,094, filed on Sep. 22, 2017, and titled "WHEEL HUB," which is hereby incorporated by reference in its entirety.

TECHNICAL FIELD

This application relates to sensors and sensor equipment. More specifically, this application relates to wireless communication sensors embedded into wheel hubs for vehicles.

BACKGROUND

A wheel hub is an automotive part used on most automotive vehicles, including cars, passenger vehicles, and light and heavy trucks. The wheel hub houses the wheel bearing and attaches to the brake rotor. Essentially, the wheel hub keeps the wheel spinning while also keeping it attached to the vehicle. As such, it is important to ensure that the wheel hub is operating efficiently and effectively to maintain proper performance of the vehicle. Monitoring the operating parameters of the wheel hub can help ensure continuing wheel hub performance by identifying and diagnosing potential operating issues. However, because the wheel hub comprises many moving parts and has a location that is often subject to harsh environmental conditions, it can be difficult to continuously monitor wheel hub parameters using traditional sensing equipment.

SUMMARY

This application describes wheel hubs, sensors mounted to or embedded within wheel hubs, and networks of sensors installed on wheel hubs. In one example, a sensor attaches to (e.g., mounts to or embeds within) a wheel hub. The sensor node includes a power source that supplies electricity to the sensor node and its components. The power source can include one or more of a battery, a capacitor, a generator (e.g., a thermoelectric generator), and/or an input port. The sensor also includes a sensing device that detects and monitors at least one parameter associated with the wheel hub. The sensing device can include one or more of an accelerometer, a gyroscope, a temperature sensor, a pressure sensor, and a strain sensor. The sensor node also includes a communication module that communicates via wireless communication signals, for example, with a remote server or network. The sensor note has a processing device in communication with each sensing device and the communication module. The processing device collects data from the sensing devices, processes the data, and based on that processing, communicates information relating to the wheel hub to a remote server or network.

BRIEF DESCRIPTION OF THE DRAWINGS

FIG. 3 shows different sensor nodes embedded in a variety of different locations of a wheel hub in accordance with examples described herein.

FIG. 4 shows a sensor node embedded in a hubcap that is mounted on a wheel hub in accordance with examples described herein.

DETAILED DESCRIPTION

This application describes wheel hubs with telematics sensors. The sensors are attached to the wheel hub, for instance, by being mounted to or embedded within the hub. The sensors relay the data that they collect or sense wirelessly to a console, network, or other electronic device. This transmitted data can assist in remote diagnostics and predictive maintenance of the wheel hubs. In some cases, multiple sensors embedded in multiple different wheel hubs on a vehicle communicate wirelessly to form a mesh network of sensors. Through the mesh network, the sensors and the related monitoring equipment can all communicate; thereby allowing for the comparison and analysis of information measured pertaining to the multiple wheel hubs. This can facilitate an improvement in the automated diagnostic and maintenance process. Further, mounting the sensors to the wheel hubs, or embedding them within the wheel hubs helps to simplify the installation process and thus reduces the manufacturing costs associated with employing other monitoring systems.

The sensors described herein have wireless communication capabilities and can be embedded or attached to the wheel hubs. Via wireless communication, the sensors can form a network, for instance, via a server that is remote or local to the vehicle. A processing device that communicates with the network can analyze the data from the sensors and make comparisons on multiple wheel hubs on a vehicle.

Figure 1:
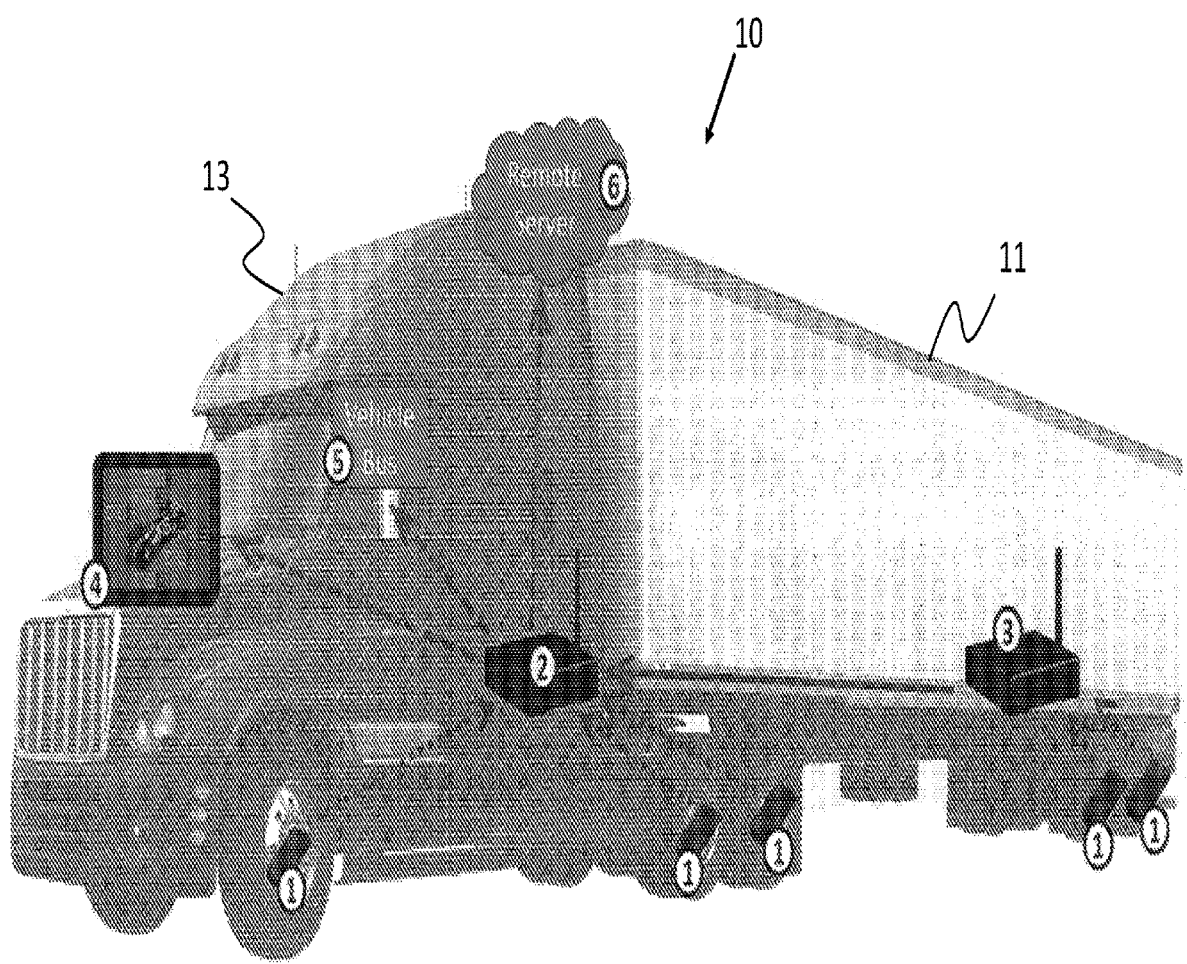
FIG. 1 shows a heavy truck equipped with a sensor communication in accordance with examples described in this application.

FIG. 1 shows a vehicle 10, specifically a truck, equipped with a sensor network that includes a plurality of sensor nodes 1. The network includes local servers, such as a cab base station 2 and a trailer base station 3, and local display devices such as a local interface or console 4, and controller networks, such as vehicle bus 5. The system is capable of communicating remotely with a remote server 6 or other cloud-based devices, for example, via the internet.

In FIG. 1, one or more sensor nodes 1 are associated with individual wheel hubs of the truck 10. The sensor nodes 1 can include a variety of different data collection equipment, including but not limited to position sensors, pressure sensors, temperature sensors, vibration sensors, optical sensors, sound sensors, accelerometers, gyroscopes, global positioning sensors, RFID tags or readers, or laser scanners, among others.

The sensor nodes 1 can also include data processing equipment, such as a CPU or other microprocessor that takes data received from other sources to generate information about the sensor, wheel hub, and/or vehicle. In some examples, each sensor node 1 includes both sensing equipment and a processing unit of some type. The sensor nodes 1 also include communication equipment that allows the nodes 1 to communicate with other sensors or devices on the network.

The sensor nodes 1 collect and/or process information about the wheel hub and the associated components and relay the information to local servers. For example, sensors along the cab portion 13 of the truck 10 relay information to the cab base station 2. The cab base station 2 can be a server or router on board the vehicle 10, and may include a processing device. In some examples, the base station 2 receives and processes data transmitted from the sensor nodes 1 and establishes metrics, which may relate to the health or performance of the wheel hubs on the vehicle. These metrics can also be used to perform condition monitoring.

The base station 2 can transmit the metrics to local devices, such as an interface 4 (e.g., a local console) on board the cab 13 of the truck 10, or to another user operated device, such as a computer, tablet, smart phone, or the like. In this way, the vehicle operator (e.g., driver) can be aware of the operating conditions of the wheel hub, and take action when appropriate. The base station 2 may also transmit the metrics to a vehicle bus 5, which directly or indirectly controls operation of the vehicle 1 or vehicle components. The vehicle bus 5 may also use the metrics to adjust performance or operating parameters to account for the operating conditions of the wheel hubs. In some examples, the base station 2 may communicate with a remote server 6 via wireless communication techniques, for instance, via the internet or other cloud-based infrastructures.

FIG. 1 also shows that sensor nodes 1 are associated with the hubs on the trailer portion 11 of the vehicle 10. These trailer sensor nodes 1 communicate with a separate base station 3 associated with the trailer 11. This trailer base station 3 can thus forward data collected from the trailer sensor nodes 1 to the base station 2 on the cab 13 of the truck 10. In other formats, the trailer base station 3 can collect, process, and store data locally and transmit the data to the truck base station 2, or directly to other remote servers 6 at a time in the future.

In some examples, the sensor network evaluates the data collected by the sensor nodes 1 and the associated equipment of the system individually per each sensor node. In other examples, the network aggregates information from each sensor and compares and analyzes the information together as a system. In such an example, the network may use the data to detect differences among the sensors at various wheel hubs, thereby highlighting conditions that may warrant attention. The network may also use the data to detect and report on the condition of the components within and around the hubs including the wheels and wheel ends, bearings, seals, tires, and brakes.

Figure 2:
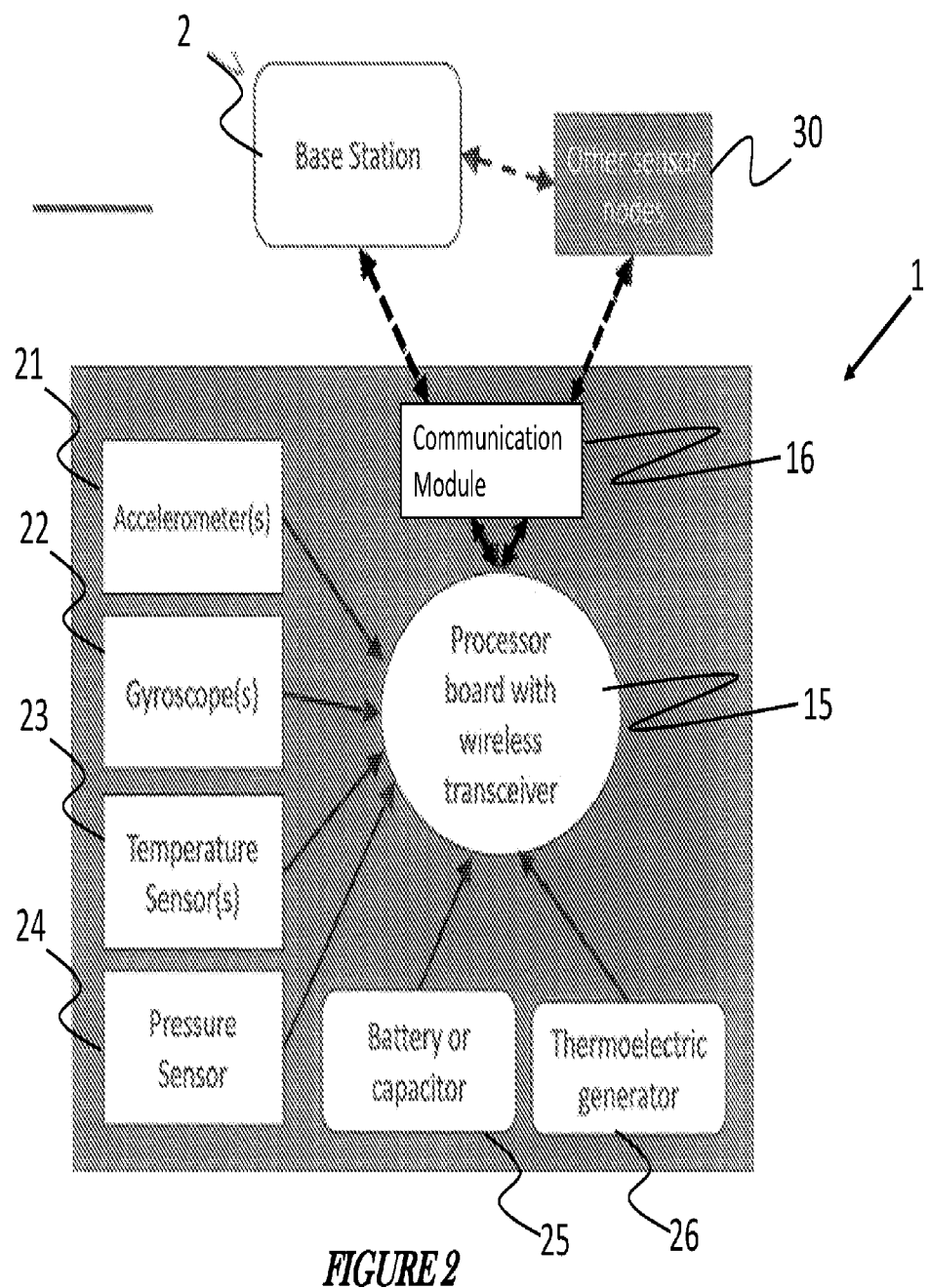
FIG. 2 is a block diagram showing the operation of a sensor node used in accordance with examples described herein.

FIG. 2 is a schematic block diagram of one example of a sensor node 1, showing the sensors and other components of the node 1, as well as the other components of the network with which the node 1 communicates. In this embodiment, the sensor node 1 comprises one or more sensors or sensing devices. The sensing devices include an accelerometer 21 to measure the linear acceleration and a gyroscope 22 to measure the angular momentum of the sensor node 1. The sensor node 1 also includes a temperature sensor 23 and a pressure sensor 24 to measure thermodynamic properties of the hub. The sensor node 1 may also include a strain sensor that monitors the strain or stretch in the material of a hub.

The sensor node 1 also includes a power source. The power source can include a battery 25, a capacitor, and/or a power input (e.g., a port for receiving electrical power from an outside source). The power source can also include a generator 26, such as a thermoelectric generator that generates electricity from thermal energy. In some examples, the generator can include a generator that turns kinetic energy into electrical energy. For example, the generator may be able to convert movement or vibrations in the wheel hub into electricity that powers the sensor node. The generator 26 can also operate in connection with the capacitor 25 so that electricity can be stored in the capacitor for later harvesting. The power source supplies power to operate the sensor node 1 and the associated components.

The sensor node 1 also includes a processor 15, which communicates with the various sensors and components of the sensor node 1. The processor 15 can also communicate wirelessly via a communication module 16, which utilizes one or more of a variety of wireless communication techniques, including radio frequency, infrared, WiFi, and Bluetooth, to name a few examples, to communicate with remote devices. In this way, the sensor node 1 can communicate with other remote devices, such as the base stations 2 or 3 shown in FIG. 1, with other sensor nodes in a mesh network 30, or with other networks or network devices. In some examples, the processor 15 aggregates data from the various sensor devices and generates metrics from that data, but in other examples the processor 15 collects and transmits the data without providing any particular processing or analysis. The processor 15 can also receive data and commands wirelessly through the communication module 16. For example, the sensor can receive commands from a control interface in the cab of the vehicle 1, or via a remote computer via the internet.

The sensor node 1 of FIG. 2 is just an example configuration, and other examples may have components that include more, less, or other components not shown in FIG. 2, or combinations thereof.

FIGS. 3 and 4 show various locations for mounting or embedding a sensor node 1 relative to a wheel hub. FIG. 3 shows different sensor nodes embedded in a variety of different locations of a wheel hub 20. For example, sensor node 7 is embedded in the oil fill plug of the hub 20. Sensor node 8 is mounted to the outside of the inner portion of the hub 20. Sensor node 9 is fastened or embedded in a pocket of the hub 20. The sensor node 9 can be potted in using epoxy or other potting compound into a cast-in pocket of the hub. Alternatively, the sensor node 9 could be fastened or potted into a machined-in pocket of the hub 20. FIG. 4 shows a sensor node embedded 14 embedded in a hubcap 17 that is mounted on a hub.

The sensor boards can be affixed to a cast-in pocket in the hub with machined features specifically for mounting the sensor board. The potting epoxy compound can protect the sensor board from the harsh environment of the wheel end. This allows for vibrations to transfer into the vibration sensor because it has rigid contact with the hub. It also allows good heat transfer from the hub to enable energy harvesting to power the sensor node.

In operation, the sensor nodes 1 can be used to detect a variety of different parameters. For example, the sensor node 1 may be configured to detect hub rotational speed using a gyro sensor, an accelerometer sensor, or combinations thereof. The hub rotational speed can be used in connection with other data and calculations to improve the accuracy of the calculations pertaining to the sensors.

In one example, the accelerometer and gyroscope sensors detect damage or adjustment problems associated with bearings in the wheel hub. The sensors detect and monitor the magnitude of vibration at specific frequencies corresponding to the frequency multipliers of the bearing, and take into account the rotational speed of the hub. The accelerometer vibration data help to detect brake component irregularities. The accelerometer data may also be used to detect tire imbalance or damage by looking at the magnitude of vibration at the frequency corresponding to the rotational speed of the hub.

The described systems and sensors can also be used to detect bearing damage, brake damage, and other wheel end issues by monitoring the temperature of the hub, and comparing it to ambient air temperature and the other hubs on the vehicle.

In some examples of operation, the sensor nodes are used to monitor the lubrication level in the hub using a pressure sensor measuring inside the hub cavity. For example, the lubrication level can be determined in proportion to the height of the lubrication fluid column over the sensor and the rotational velocity of the hub.

Certain embodiments may use an accelerometer, gyroscope, or combinations thereof, mounted to a wheel hub to measure the hub speed. The sensor nodes can then wirelessly transmit the hub speed to the vehicle (or to processing equipment associated with the vehicle), and the data can be used to provide a speed signal. Such a speed signal can be used to monitor anti-lock braking systems or other functionality. This can provide benefits over existing systems. For example, existing systems wired sensor can be used to measure the hub rotation speed. Information from these wired sensors is transferred utilized by braking systems on the truck to monitor various parameters. These wired sensors can fail or provide unreliable information. For instance, the sensors can develop issues caused from wear and damage to the sensors, the sensors moving out of range, and corrosion that can occur on the sensors, in particular, the wired parts of the sensors. Replacing these systems with the wireless sensor nodes described herein, by embedding the wireless sensors into the wheel hub for instance, can improve the performance and reliability of the sensors.

In some embodiments, a sensor mounted to a wheel hub may be configured to use an accelerometer, gyroscope, or combinations thereof can to track the cumulative number of rotations of the wheel hub. The collected rotation data could then be used, for example, things tracking the mileage, or distance traveled, of the vehicle and/or trailer.

In another method of operation, a sensor node mounted to a wheel hub can monitor strain in the material of a wheel hub. The collected data can then be used to measure hub speed. For example, as a hub rotates, it can experience alternating stress. By measuring the strain in the hub via a strain sensor and measuring the rate of the fluctuations in the strain, the system can estimate the rotation speed of the hub. This method can provide a cleaner signal than that provided by other types of sensors typically used to monitor hub speed while also limiting the sources of noise into the signal.

In another example, the mounted strain sensor can be used to measure hub cumulative rotations for tracking mileage or part life.

In another example, a sensor can be configured to measure wheel stud stretch or strain in wheel studs. In this way, when the sensors are embedded or mounted in a wheel hub, the hub will detect and report the condition of the wheel to hub bolted joint.

This application describes preferred embodiments and examples of wireless wheel hub sensors for illustrative purposes, not intended to be limiting. Those skilled in the art will recognize that the described examples could be modified and/or combined with one another without departing from the scope described herein. Further, features of one embodiment or example may be combined with features of other embodiments or examples to provide still further embodiments or examples as desired. All references that this application cites, discusses, identifies, or refers to are hereby incorporated by reference in their entirety.

The invention claimed is:

1. A sensor node mounted to a wheel hub, the sensor comprising:
   a power source comprising a thermoelectric generator configured to supply electricity to the sensor;
   a sensing device configured to detect and monitor at least one parameter associated with the wheel hub;
   a communication module configured to communicate via wireless communication signals; and
   a processing device in communication with the sensing device and the communication module, the processing device configured to collect and process data from the sensing device,
   wherein the sensor is configured to communicate information relating to the wheel hub to a remote server.

2. The sensor node of claim 1, wherein the sensing device comprises at least one of an accelerometer, a gyroscope, a temperature sensor, and a pressure sensor.

3. The sensor node of claim 1, wherein the power source comprises a battery or a capacitor.

4. The sensor node of claim 1, wherein the sensor node is configured to be embedded into the oil fill plug of the wheel hub.

5. The sensor node of claim 1, wherein the sensor node is configured to be mounted to the outside of an inner portion of the wheel hub.

6. The sensor node of claim 1, wherein the sensor node is configured to be installed in the pocket of a wheel hub.

7. The sensor node of claim 6, wherein the sensor node is configured to be potted using an epoxy or potting compound into a wheel hub pocket.

8. The sensor node of claim 1, wherein the sensor node is embedded in a hubcap that is mounted on the hub.

9. A wheel hub configured to operate in connection with a brake hub and a drive axle of a vehicle, the wheel hub comprising:
   a housing comprising an oil fill plug;
   a wheel bearing within the housing; and
   a sensor node comprising:
      a power source configured to supply electricity to the sensor;
      a sensing device configured to detect and monitor at least one parameter associated with the wheel hub;
      a communication module configured to communicate via wireless communication signals; and
      a processing device in communication with the sensing device and the communication module, the processing device configured to collect and process data from the sensing device,
   wherein the sensor node is embedded into the oil fill plug of the wheel hub housing, and wherein the sensor is configured to communicate information relating to the wheel hub to a remote server.

10. A wheel hub configured to operate in connection with a brake hub and a drive axle of a vehicle, the wheel hub comprising:
    a housing comprising a pocket;
    a wheel bearing within the housing; and
    a sensor node comprising:
       a power source configured to supply electricity to the sensor;
       a sensing device configured to detect and monitor at least one parameter associated with the wheel hub;
       a communication module configured to communicate via wireless communication signals; and
       a processing device in communication with the sensing device and the communication module, the processing device configured to collect and process data from the sensing device, wherein the sensor node is embedded into the pocket of the wheel hub housing, and wherein the sensor is configured to communicate information relating to the wheel hub to a remote server.

11. A wheel hub configured to operate in connection with a brake hub and a drive axle of a vehicle, the wheel hub comprising:
a housing;
a wheel bearing within the housing;
a hubcap; and
a sensor node comprising:
 a thermoelectric generator configured to supply electricity to the sensor;
 a sensing device configured to detect and monitor at least one parameter associated with the wheel hub;
 a communication module configured to communicate via wireless communication signals; and
 a processing device in communication with the sensing device and the communication module, the processing device configured to collect and process data from the sensing device,
wherein the sensor node is configured to communicate information relating to the wheel hub to a remote server.

12. A vehicle comprising:
a plurality of wheels, each wheel having a wheel hub including a hub housing, a wheel bearing within the housing;
a plurality of sensor nodes, at least two sensor nodes installed relative to each of two separate wheel bearings of the vehicle, individual sensor nodes comprising:
 a power source comprising a thermoelectric generator configured to supply electricity to the sensor;
 a sensing device configured to detect and monitor at least one parameter associated with the wheel hub;
 a communication module configured to communicate via wireless communication signals; and
 a processing device in communication with the sensing device and the communication module, the processing device configured to collect and process data from the sensing device;
a display terminal comprising a user interface; and
a base communication station configured to communicate the communication module of the plurality of sensor nodes and the display terminal,
wherein the base station is configured to receive information transmitted from at least two sensor nodes installed relative to the two separate wheel bearings.

13. A sensor node mounted to a wheel hub, the sensor comprising:
a power source configured to supply electricity to the sensor;
a sensing device configured to detect and monitor at least one parameter associated with the wheel hub;
a communication module configured to communicate via wireless communication signals; and
a processing device in communication with the sensing device and the communication module, the processing device configured to collect and process data from the sensing device,
wherein the sensor is configured to communicate information relating to the wheel hub to a remote server, and
wherein the sensor node is configured to be embedded into the oil fill plug of the wheel hub.

14. A sensor node mounted to a wheel hub, the sensor comprising:
a power source configured to supply electricity to the sensor;
a sensing device configured to detect and monitor at least one parameter associated with the wheel hub;
a communication module configured to communicate via wireless communication signals; and
a processing device in communication with the sensing device and the communication module, the processing device configured to collect and process data from the sensing device,
wherein the sensor is configured to communicate information relating to the wheel hub to a remote server, and
wherein the sensor node is configured to be installed in the pocket of a wheel hub.

* * * * *